(12) United States Patent
Lee et al.

(10) Patent No.: US 7,949,372 B2
(45) Date of Patent: May 24, 2011

(54) DATA COMMUNICATIONS ENABLED BY WIRE FREE POWER TRANSFER

(75) Inventors: Yeechun Lee, Mountain View, CA (US); Victor Su, Mountain View, CA (US)

(73) Assignee: Power Science Inc., Mountain View, CA (US)

( * ) Notice: Subject to any disclaimer, the term of this patent is extended or adjusted under 35 U.S.C. 154(b) by 896 days.

(21) Appl. No.: 11/364,693

(22) Filed: Feb. 27, 2006

(65) Prior Publication Data

US 2007/0202931 A1    Aug. 30, 2007

(51) Int. Cl.
*H04B 1/38* (2006.01)
(52) U.S. Cl. ............... 455/557; 455/41.2; 455/556.1; 455/552.1
(58) Field of Classification Search ............ 455/41.2, 455/557, 556.1, 552.1
See application file for complete search history.

(56) References Cited

U.S. PATENT DOCUMENTS

| | | | | |
|---|---|---|---|---|
| 6,957,047 B1 * | 10/2005 | Young et al. | .................... | 455/83 |
| 6,989,733 B2 * | 1/2006 | Simonsen et al. | ............ | 375/259 |
| 7,474,875 B1 * | 1/2009 | Dayan et al. | ................. | 455/41.2 |

\* cited by examiner

*Primary Examiner* — Yuwen Pan
(74) *Attorney, Agent, or Firm* — Holland & Knight LLP (57) ABSTRACT

A system and method is provided for enabling data transfer over the same electrical routing network utilized by the mobile device to obtain electric power from an external power source. The system includes a contact base connected to a power supply, and mobile device adapters. The contact base is a flat surface that comprises a segmented conductive area with conductive contact pads on the surface, and a plurality of base controller modules that detect the presence of compatible mobile devices placed on the contact surface and routes the electrical power through the contact points on the surface to the compatible mobile devices accordingly, after a handshake protocol. The data communication portion of the system comprises a power line communication bypass circuit and a repeater for power line communication either within or adjunct to the power supply that powers the contact base. It further comprises, on the mobile device side, a power line communication adapter which converts the analog waveform the mobile device receives through its electrical contacts into digital data and vice versa.

17 Claims, 16 Drawing Sheets

DATA COMMUNICATIONS ENABLED BY WIRE FREE POWER TRANSFER

FIELD OF THE INVENTION

The present invention relates generally to the field of data communications and the field of charging and power transfer devices. More particularly, the present invention relates to enabling data communications within a wire free power transfer infrastructure.

GENERAL BACKGROUND OF THE INVENTION

Mobile devices in this increasingly more and more connected world not only need frequent, periodic recharging, but also to exchange data with other devices or the Internet on a regular basis.

The data communications between a mobile device and another device is typically achieved by a cable, such as an USB cable, an IEEE 1394 cable, an Ethernet cable, or a proprietary serial link, as well as by wireless RF links. As with electrical interconnections, any cable-based data link entails precise and tedious alignment of electrical contact pins to enable data communication. Thus the mobile device has to have a fixed spatial relationship to the other device while data transfer is taking place. This greatly limits the mobility and the utility of the mobile device while data transfer is in progress. Wireless data communications does not require pin arrangement, but because of the intrinsically unreliable nature of wireless links in general, data transfer is not exactly a plug-and-play affair even for those mobile devices with built-in wireless data links. Some wireless data transfer methods, such as infrared communications, still requires certain degree of alignment since the infrared signal is transmitted over a fairly narrow angle. Infrared data link also is strictly one-to-one data link and can't support simultaneous data communications among multiple mobile or stationary devices.

Modern high-speed wireless standards, such as IEEE 802.11 a/b/g, and soon to be rectified UWB (ultra wide band), can provide reasonably high data transfer rates. However, since the data is transported over the air, both security and interference can become an issue. Although all high-speed wireless data communication standards provide ample security measures to safeguard the confidentiality of the data being transferred as well as protecting the mobile device from malicious attacks from the air, they all add a layer of complication which compromises their usability. Wireless links are also susceptible to interferences from natural or manmade RF sources. For example, IEEE 802.11 b/g is famous for its susceptibility to RF leakage from microwave oven that operates within the same spectrum. And interference from adjacent WiFi hotspots and other IEEE 802.11 access points can interrupt data communication and even cause the mobile device to drop its wireless connections on occasion.

Therefore, there exists a need for an alternative to both the cable-based data transfer and the wireless data communication approaches.

SUMMARY OF THE INVENTION

To achieve these and other objects there is provided a system and method for data transfer over the same electrical routing network utilized by the mobile device to obtain electric power from an external power source. In one embodiment, the system includes a contact base connected to a power supply, and mobile device adapters. The contact base is a flat surface that comprises a segmented conductive area with conductive contact pads on the surface, and a plurality of base controller modules that detect the presence of compatible mobile devices placed on the contact surface and routes the electrical power through the contact points on the surface to the compatible mobile devices accordingly, after a handshake protocol. In one embodiment, the data communication portion of the system comprises a power line communication (PLC) bypass circuit and a repeater for PLC either within or adjunct to the power supply that powers the contact base. It further comprises, on the mobile device side, a PLC adapter which converts the analog waveform the mobile device receives through its electrical contacts into digital data and vice versa. The analog PLC signals propagate over the contact base through its positive voltage rail and the ground rail, and then through the PLC bypass in the power supply to the power line infrastructure in a home or office building. Over power line, the PLC signals communicate with a PLC bridge module which is either directly connected to the Internet or to the local area network (LAN). The return PLC signals travel alone the same pathway in reverse. Optionally, the power supply also includes a PLC repeater which comprises a bi-directional amplifier to amplify PLC signals traveling in both directions.

Alternatively, two mobile devices on the same contact base surface can communicate directly via the power rails of the contact base without having to go through the power line infrastructure inside a home or office. The PLC adapter for each mobile device performs all the analog-digital conversions and vice versa, and frequency conversions and modulation/demodulation as necessary for the exchange of digital data between the two devices.

The PLC bypass circuit is required to bridge the high frequency signals across the AC-DC power supply. Such high frequency components are either blocked or strongly attenuated by the bridge rectifier, low pass filters, and the transformer, among others, which are inside a standard switch mode power supply. In addition, the PWM (pulse width modulation) controller generates a large switching signal which severely interferes with the PLC signals. The PLC bypass taps the input wires of the power supply before they reach the bridge rectifier (or a low pass filter just before the rectifying stage), filters out the AC component as well as low frequency switching noise, isolates the AC voltage, and taps the filtered and isolated PLC signals back to the output terminals of the power supply.

The PLC bypass circuit could be as simple as a coupling capacitor with a high voltage rating so that it can withstand the high AC voltage from the power line. A preferred embodiment uses a 1:1 ratio high frequency transformer to provide the AC voltage isolation, and a parallel RC circuit to filter out lower frequency components, especially the AC voltage swings.

The PLC repeater is needed when the path length PLC signals need to travel to connect two devices is too long or there is too much attenuation of the signals. The repeater itself is just a bi-directional RF amplifier with a Bandpass filter to filter out out-of-band noise, a RF power detection unit to detect the band-limited RF signals and control the RF switches to synchronously switch from one direction to the other direction. There is also an automatic gain control (AGC) unit that monitors the power level of the amplified signal and either increase or reduce the gain until the power level of the amplified signal is close to a preset power level.

In one embodiment, the data communications is performed asynchronously, i.e. without the presence of a global clock. It is therefore necessary to synchronize the local clocks between the two mobile devices in communication. A convenient way is to designate the clock on the transmitting end to be the master clock, and a clock recovery and synchronization circuitry is included in the receiving end to acquire and track the clock signals from the transmitting end. The clock recovery circuitry is preferentially located just after the frequency down conversion circuitry in the radio frequency (RF) front end (RFE) to allow less costly low frequency components to be used.

The asynchronous nature of the data communications also means that when more than one mobile devices attempt to communicate; there will be contention of the PLC resources. Contention occurs when two or more mobile devices are transmitting at substantially the same time, which results in a "collision". To avoid collision, a "carrier sense multiple access with collision detection" or CSMA/CD protocol, or a "carrier sense multiple access with collision avoidance" or CSMA/CA protocol is adopted. CSMA protocols are media access methods which resolve conflicts caused by transmission collisions. CSMA/CD works by stopping the transmission and wait a random length of time before retransmission whenever a collision has been detected. Thus CSMA/CD does not prevent collision from taking place. Rather, it tries to manage or control collisions in order to allow a single device to take over the PLC resource for a brief period of time in order to transmit a finite amount of data. CSMA/CA, on the other hand, attempts to avoid collisions by sending a brief signal to assert its intention to transmit before actually transmitting. Because the signaling packet is brief, there is less chance of collision; hence CSMA/CA can prevent collisions to some extent at a cost in the form of an overhead incurred by having each device broadcast its intention prior to transmitting. When a collision does occur, the conflict resolution method employed is the same as that of CSMA/CD.

A PLC capable mobile device module comprises a device adapter which either passively or actively interfaces with the contact base controller or controllers to provide device identity (ID) information to the base in order to instruct the base how the power should be routed. The device adapter also perform various voltage and current protection tasks as well as the necessary electrical isolation of the device ID circuit until the device has been correctly detected. Once the power is properly routed to the device contacts which comprise at least one ground contact and at least one positive contact, the device adapter connects the external routed electrical power to the device itself as well as the PLC subsystem either directly, or through a DC-DC converter. The purpose of the DC-DC converter is to convert the supplied voltage to a value more suitable for the device that is using it. In order to isolate the high frequency switching noise generated by the switching DC-DC converter, or other high frequency noise which is likely to interfere with the proper operation of PLC, one or more PLC filters are needed. Such filters can be inserted after the positive and/or ground output of the DC-DC converter to perform low pass filtering.

The PLC subsystem comprises a PLC physical layer transceiver, which provides frequency up-conversion and down-conversion, signal amplification and gain control, as well as clock recovery and retiming tasks. Additionally, it includes a baseband processor which performs A-to-D (analog to digital) and D-to-A (digital to analog) conversion, as well as modulation and demodulation. It further comprises a transmit/receive media access controller which performs framing and un-framing, collision detection/avoidance, and access control for PLC network medium. A network interface module, which could be an Ethernet controller module, or an USB controller module, allows the PLC module to interface with the corresponding network interface module inside the mobile device. Alternatively, the PLC module can directly interface the mobile device through a FIFO (first in, first out) I/O (input/output) memory buffer.

BRIEF DESCRIPTION OF THE DRAWINGS

Various other objects, features and attendant advantages of the present invention will become fully appreciated as the same becomes better understood when considered in conjunction with the accompanying drawing, in which like reference characters designate the same or similar parts throughout the several views, and wherein.

DETAILED DESCRIPTION OF THE INVENTION

Figure 1:
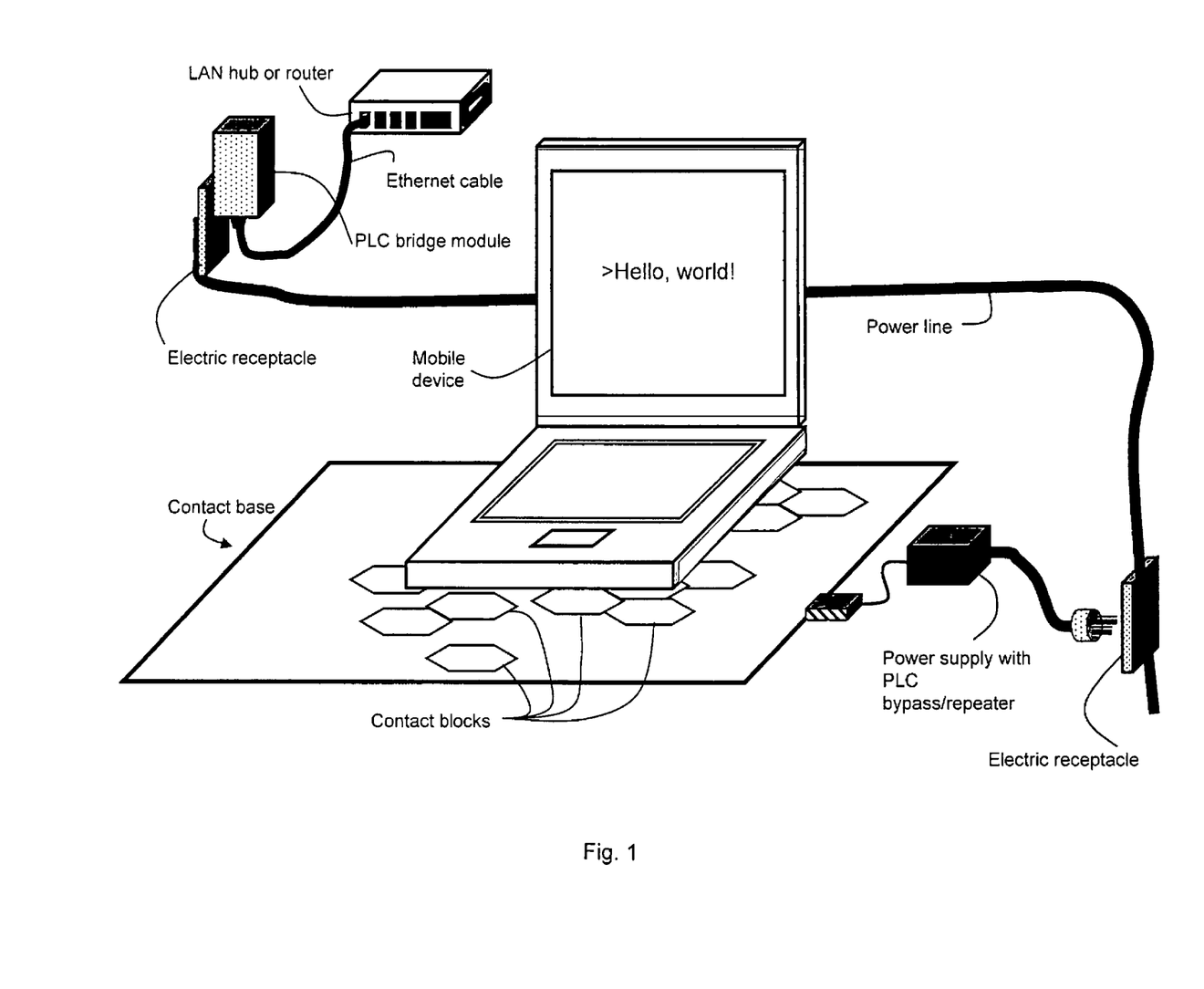
FIG. 1 illustrates an embodiment of the power line data communications for a contact based power transfer system between a notebook computer and a local area network or the Internet in accordance with the present invention.
Figure 2:
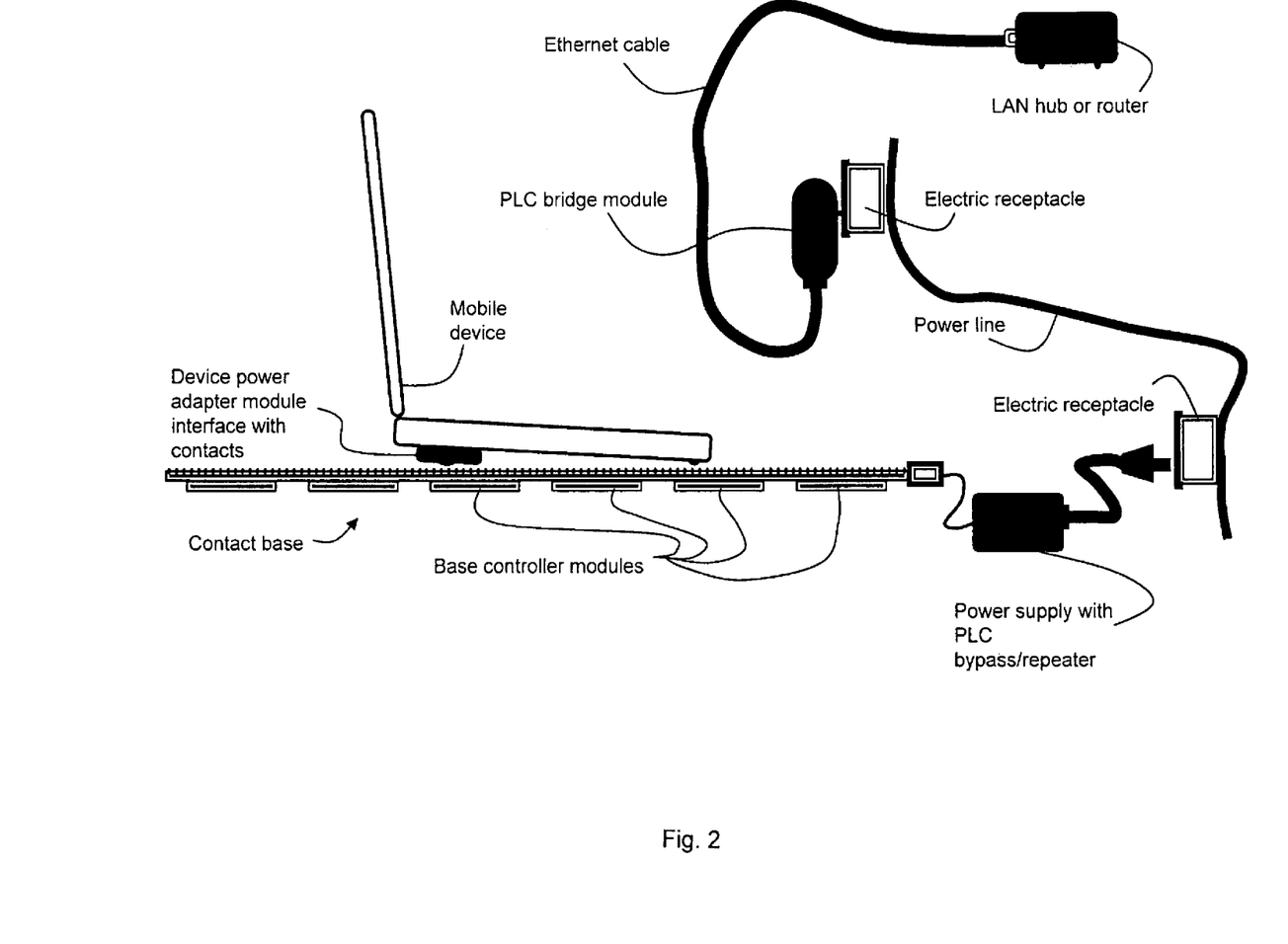
FIG. 2 show another view of the notebook computer communicating with the LAN or the Internet through the contact base which also provides the power to run or recharge the computer, the power supply with a PLC bypass and/or a repeater, the house electrical wiring, a PLC bridge module, to a LAN hub or router.
Figure 3:
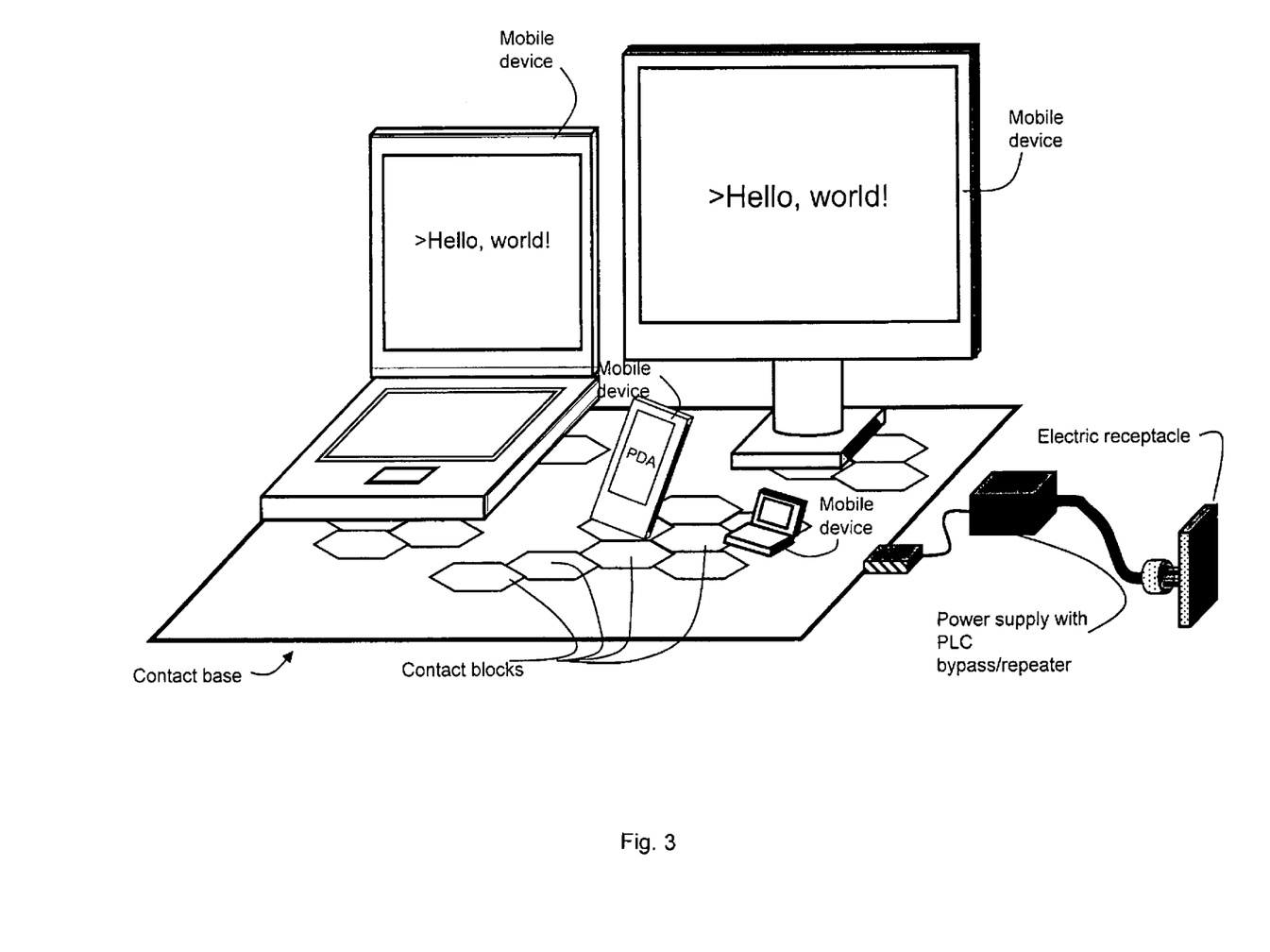
FIG. 3 shows a contact base which supplies DC powers to a plurality of mobile devices as well as provides data communications among them.
Figure 4:
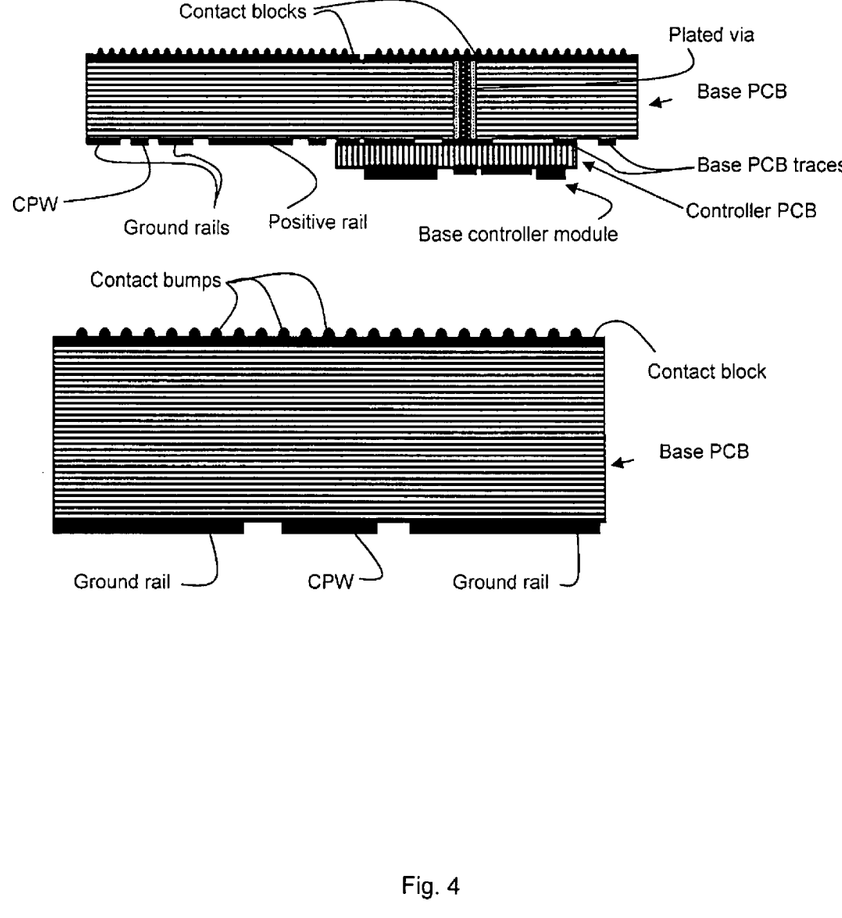
FIG. 4 depicts one embodiment of coplanar waveguide (CPW) on the contact base board.
Figure 5:
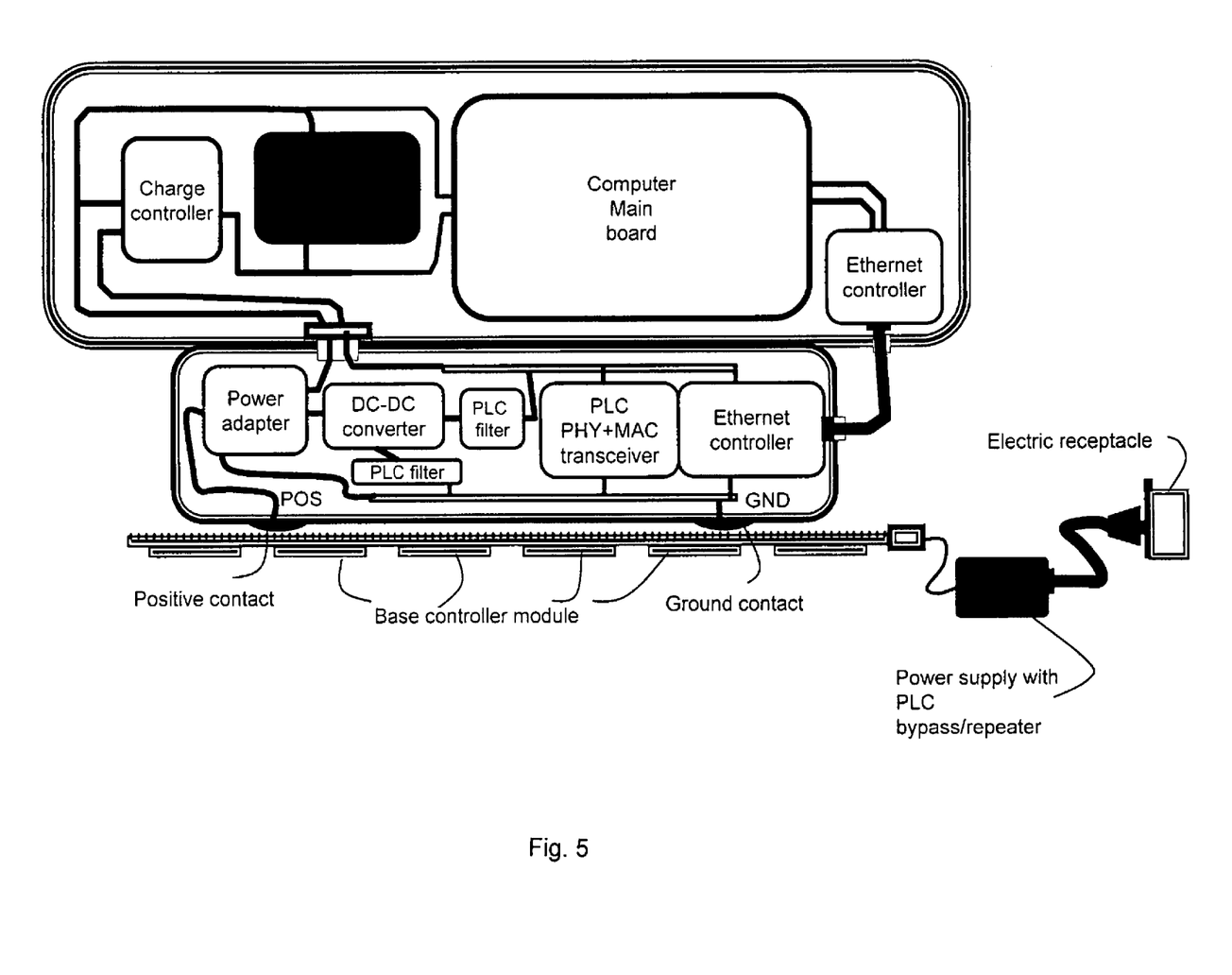
FIG. 5 illustrates an embodiment of the device power module which comprises a device adapter, PLC bypass or blocking filters, and PLC adapter subsystem. The device adapter provides the DC power source to power the notebook, and the PLC subsystem is connected to the main board through an Ethernet interface for high-speed communications.
Figure 6:
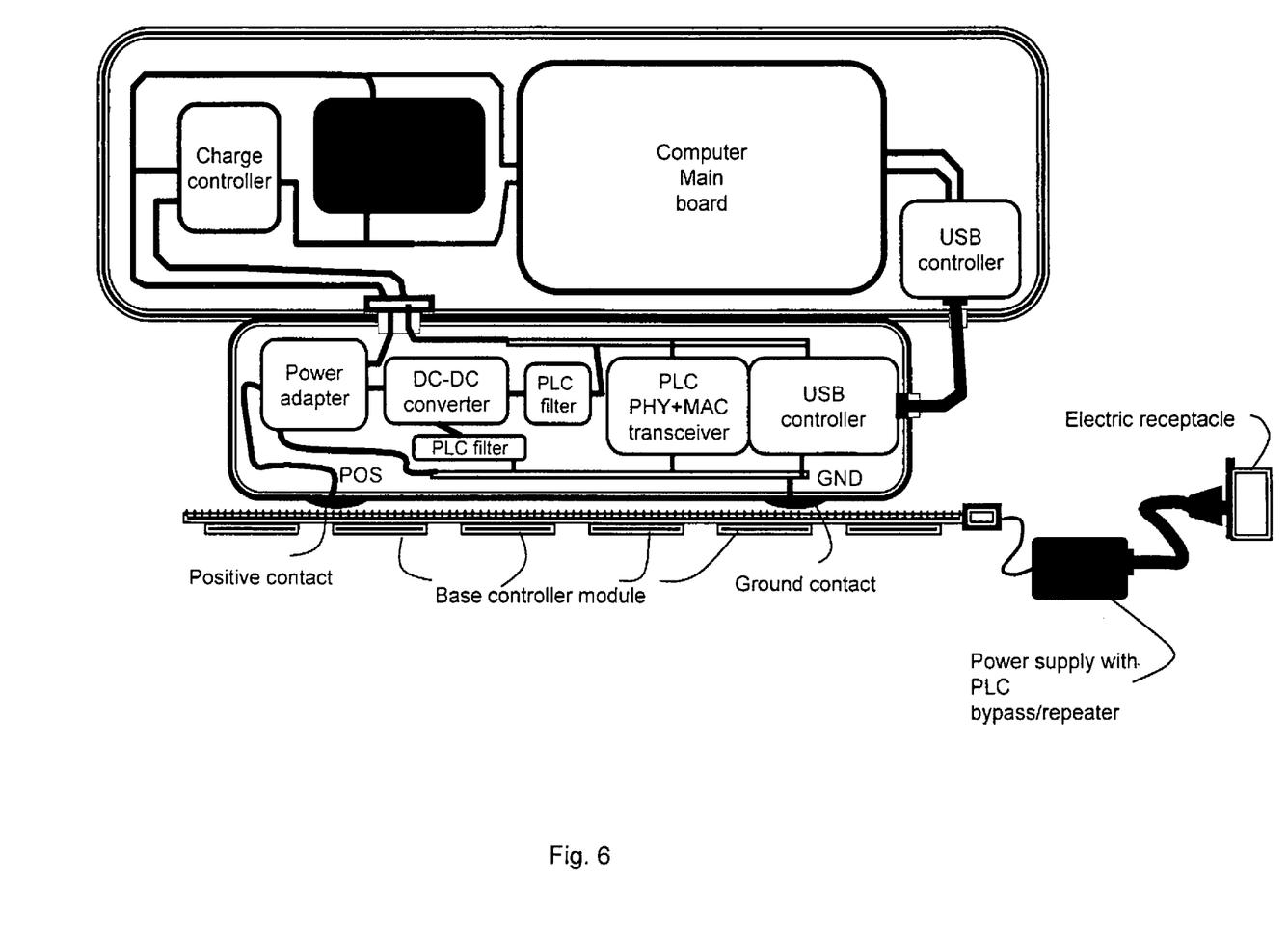
FIG. 6 is identical to FIG. 5 except that the Ethernet interfaces are replaced by an USB interfaces.
Figure 7:
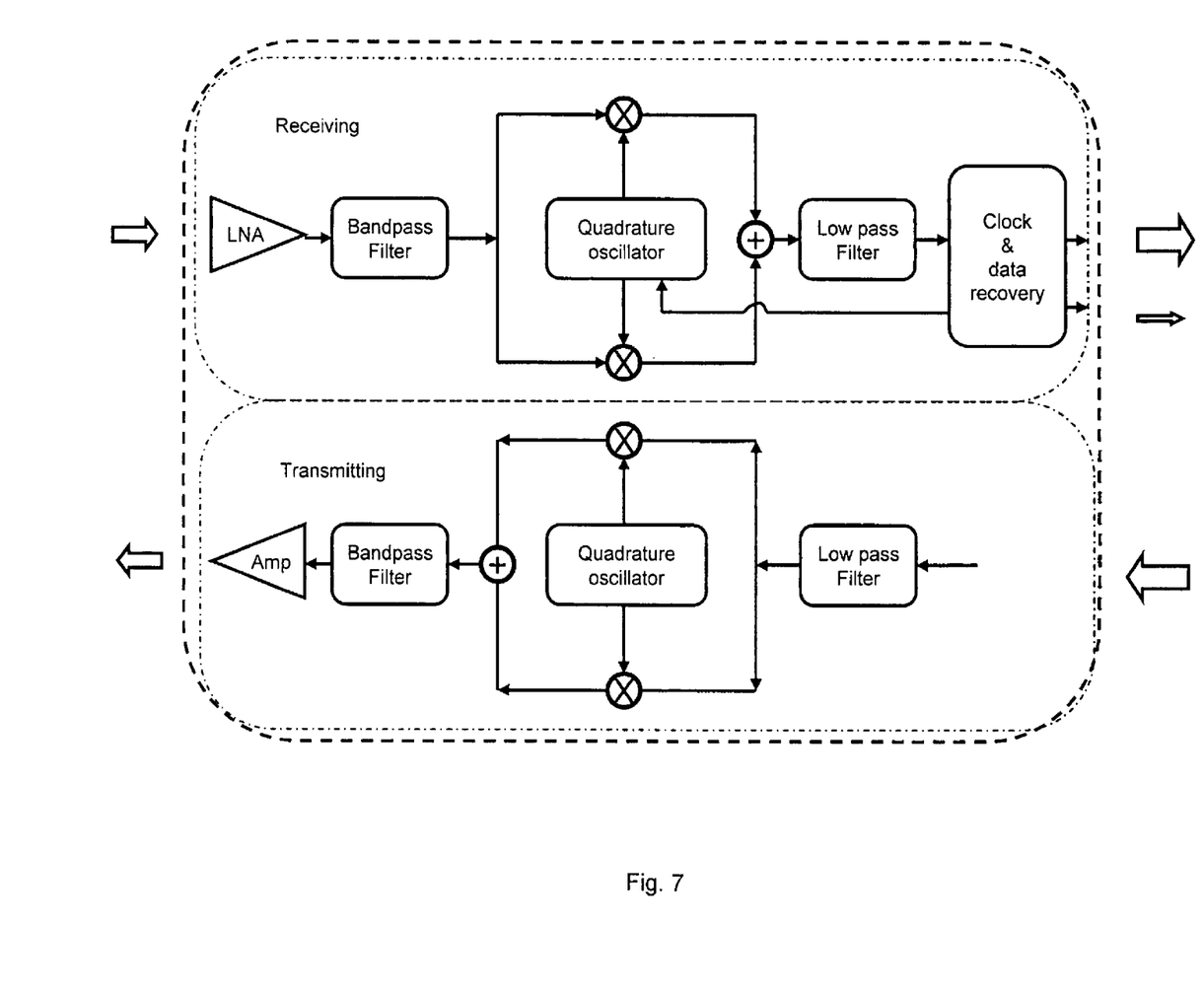
FIG. 7 sketches the PHY (physical) layer of the PLC subsystem. It comprises a RF front end, a clock recovery unit, amplifiers, filters, and mixers.
Figure 8:
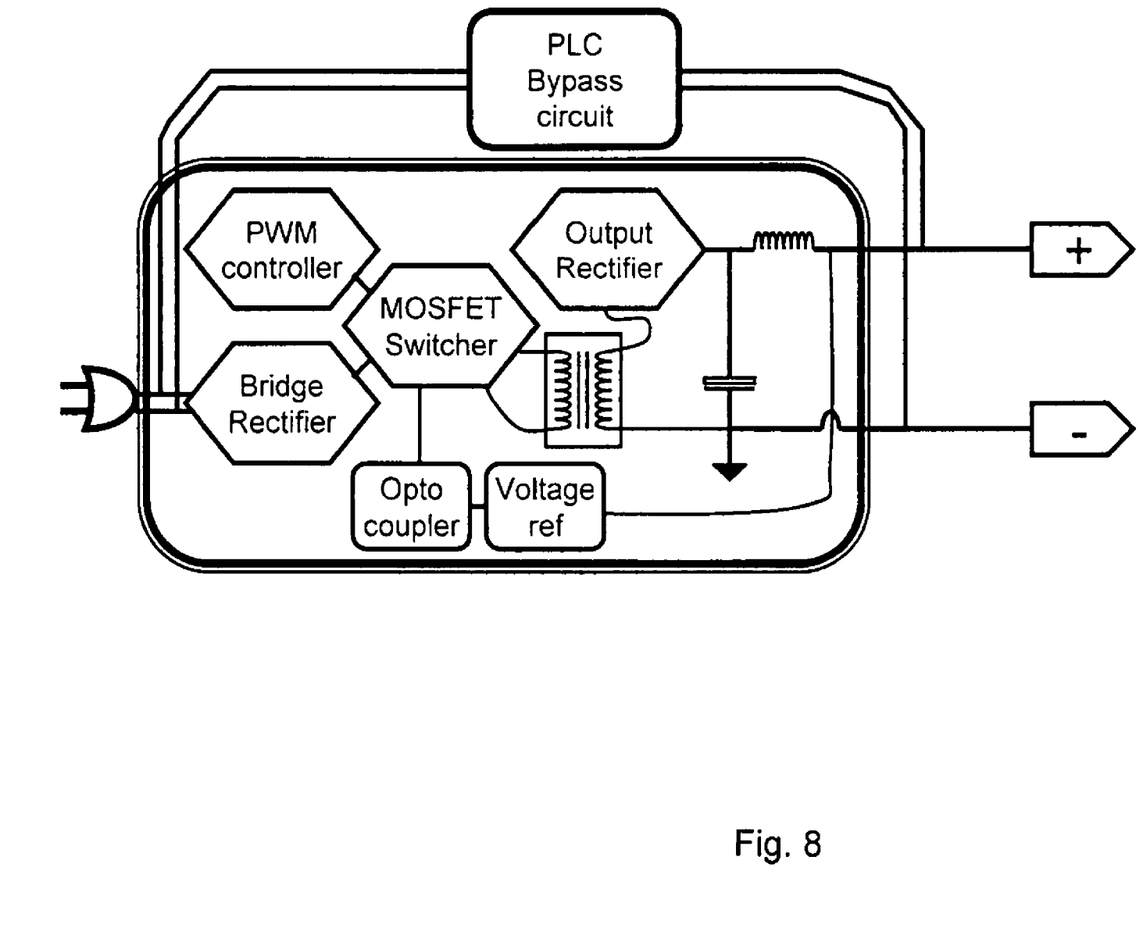
FIG. 8 depicts a DC power supply for the contact base with a PLC bypass circuit.
Figure 9:
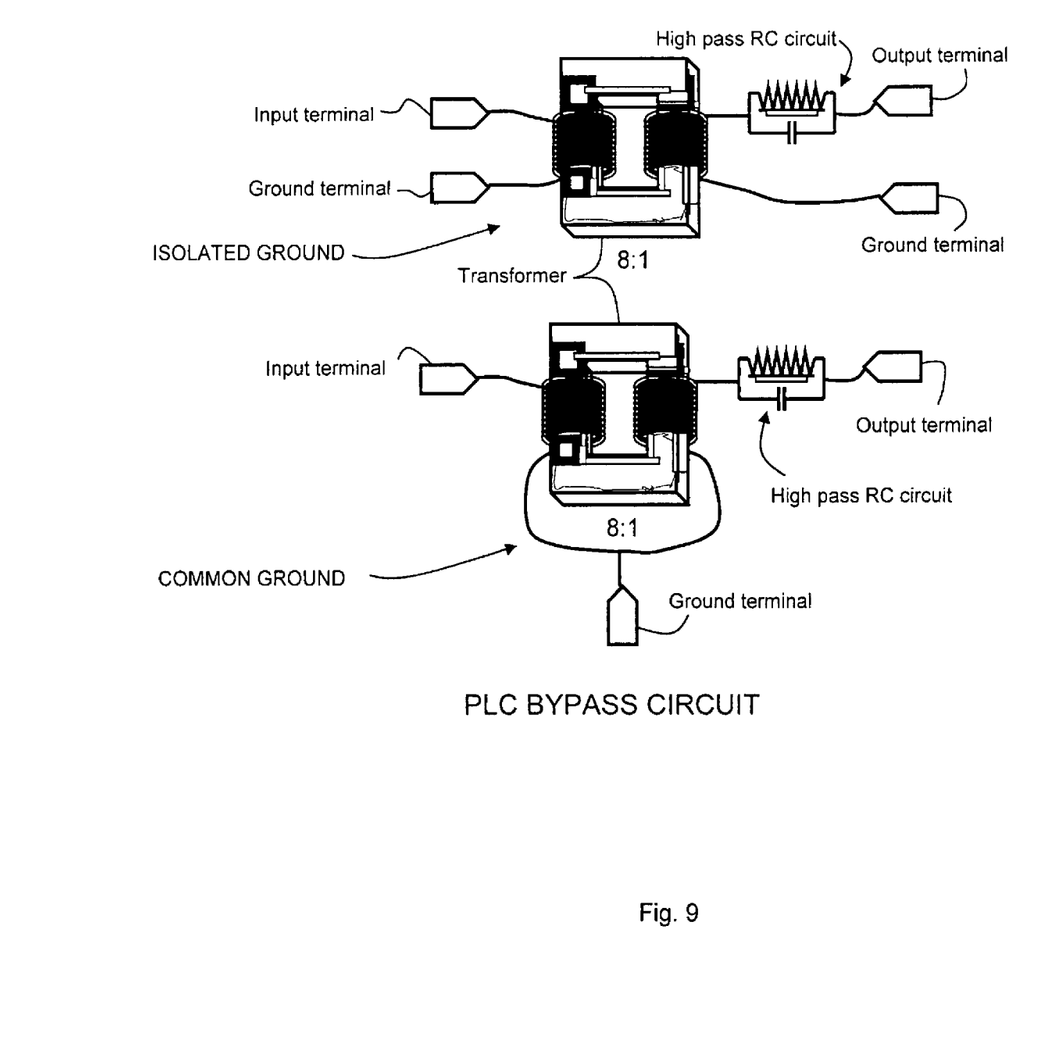
FIG. 9 shows two preferred embodiments of the PLC bypass circuit for the power supply.
Figure 10:
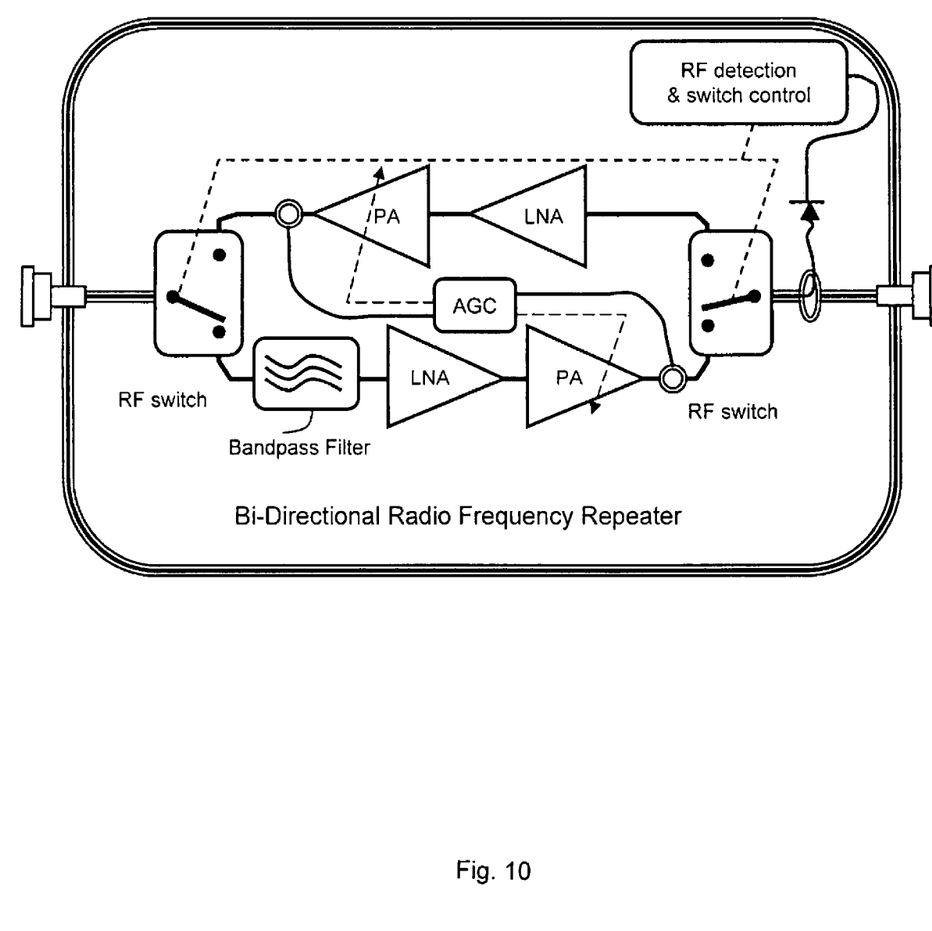
FIG. 10 illustrates an embodiment of the PLC repeater in accordance with one embodiment of the present invention.
Figure 11:
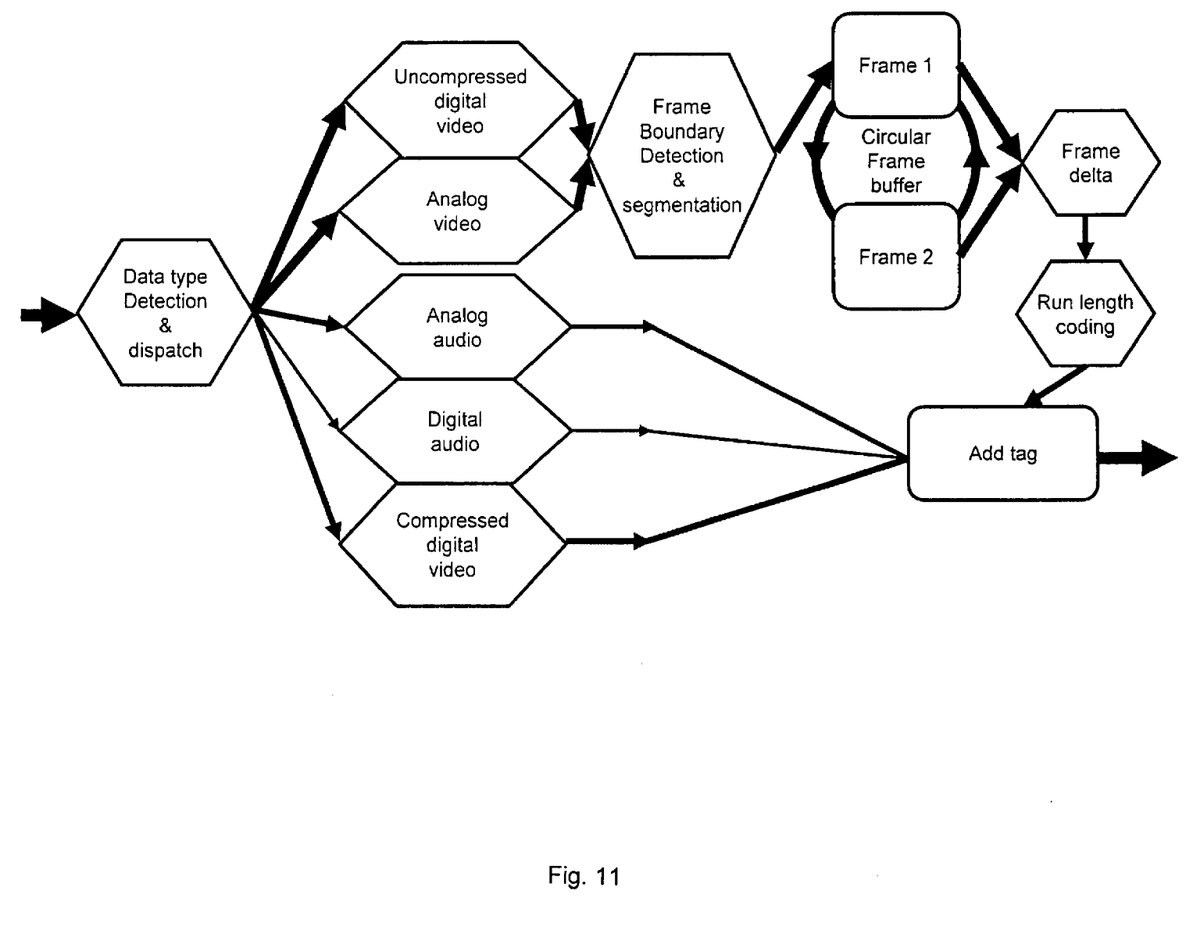
FIG. 11 is a schematic view of the compressor in accordance with one embodiment of the present invention.
Figure 12:
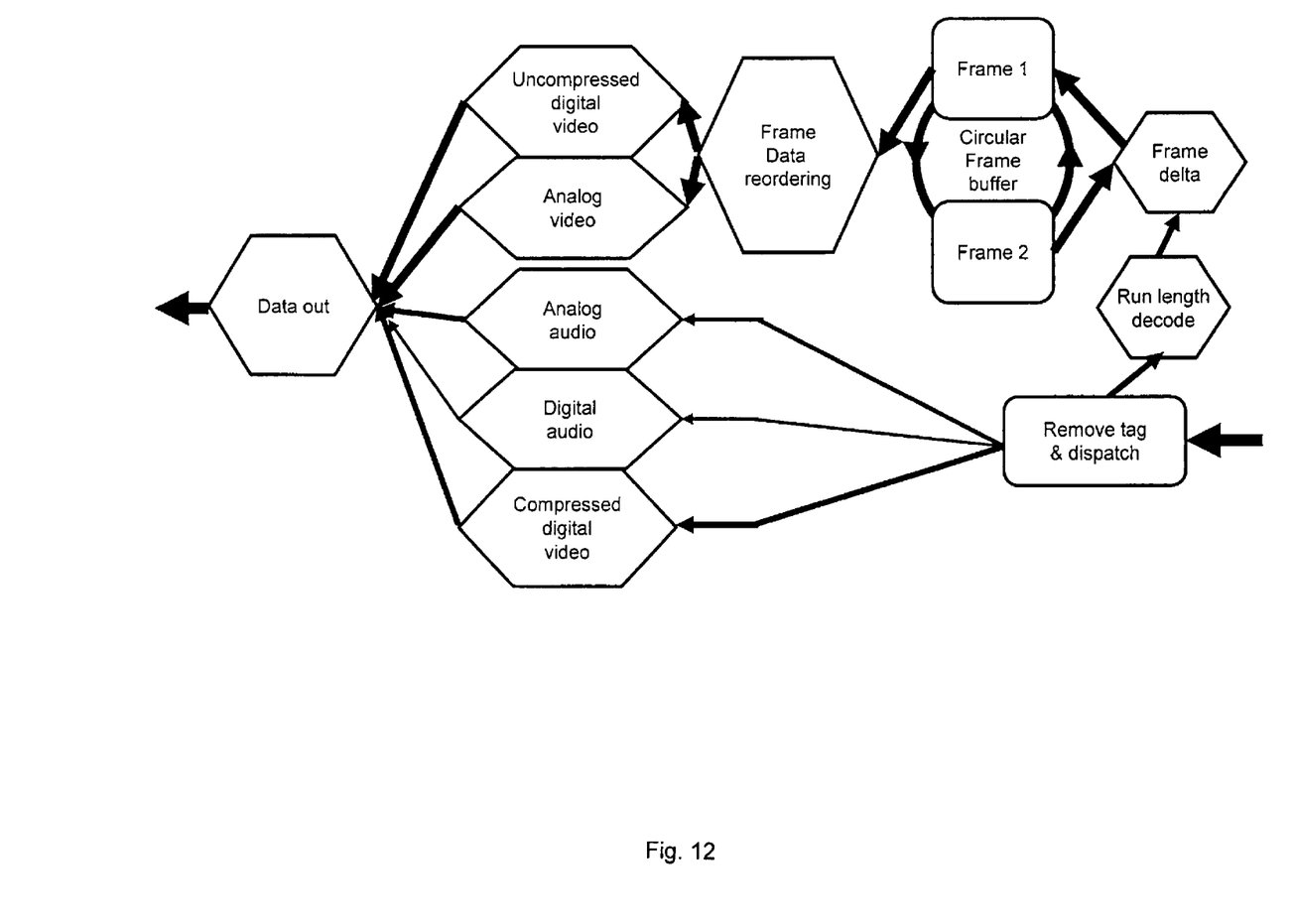
FIG. 12 is a schematic view of the decompressor in accordance with one embodiment of the present invention.
Figure 13:
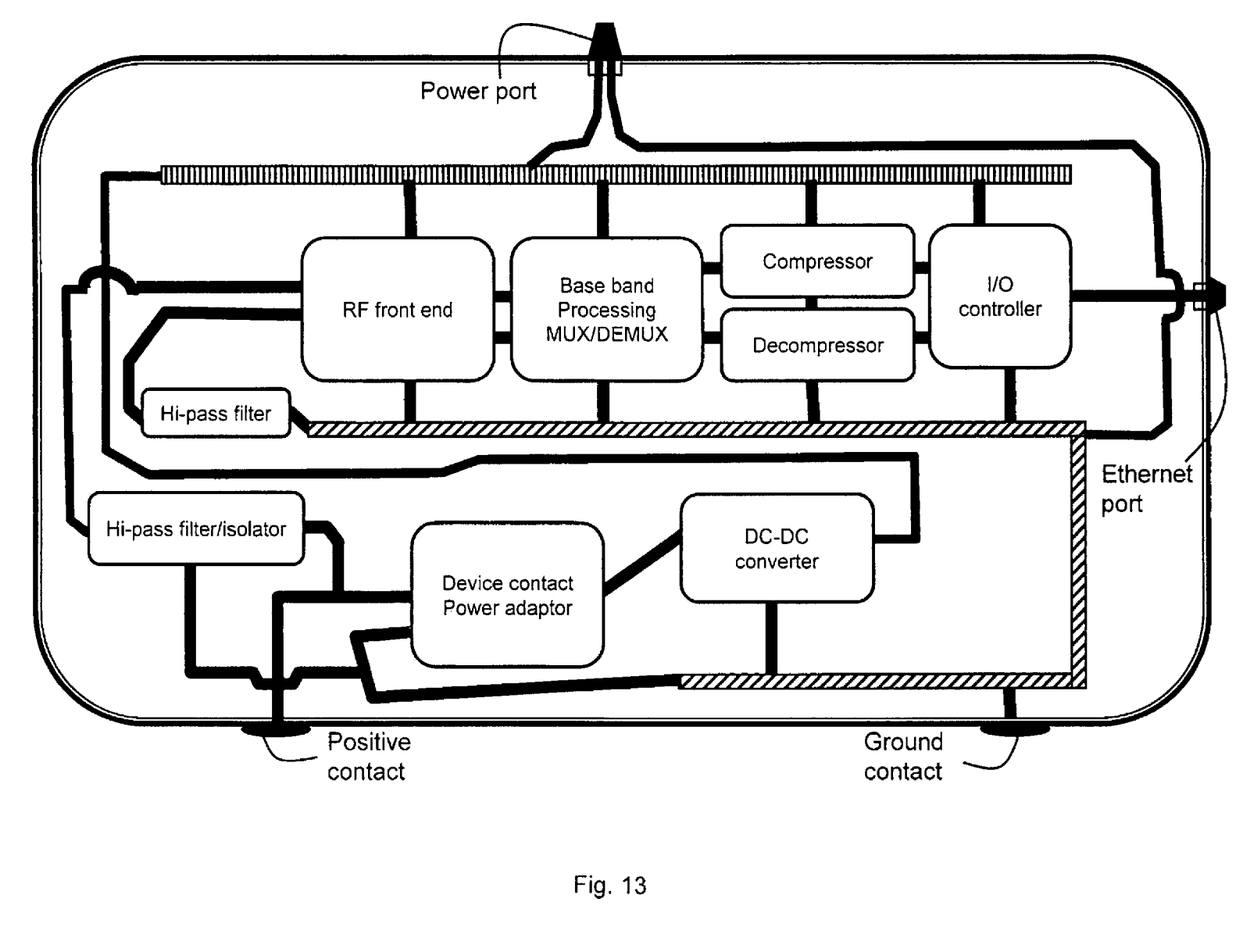
FIG. 13 illustrates a more detailed breakdown of the components of the device adapter module with an Ethernet interface in accordance with one embodiment of the present invention.
Figure 14:
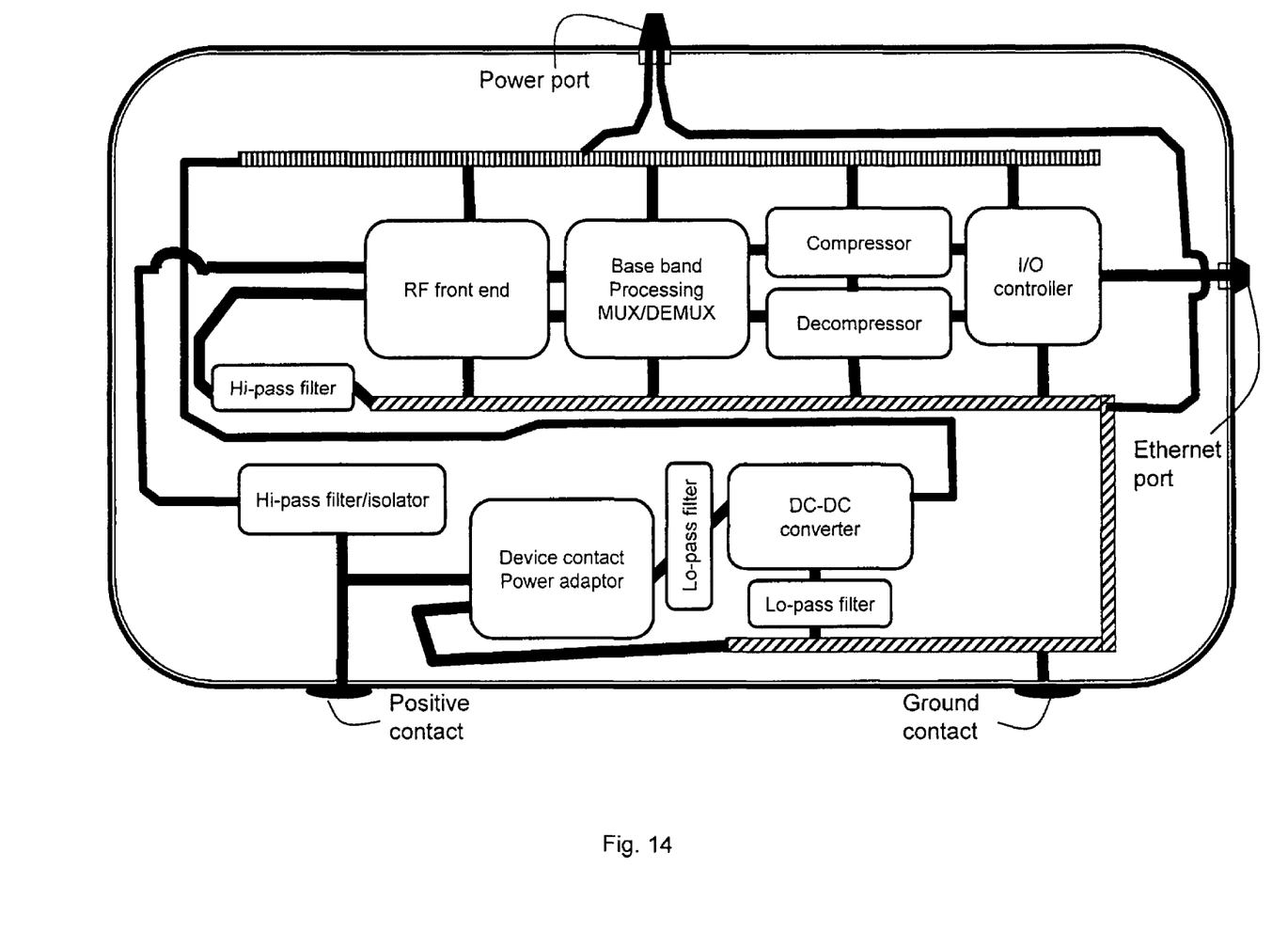
FIG. 14 illustrates another embodiment of the device adapter module which has an Ethernet network interface and additional low pass filters to block switching noise generated by the DC-DC converter.
Figure 15:
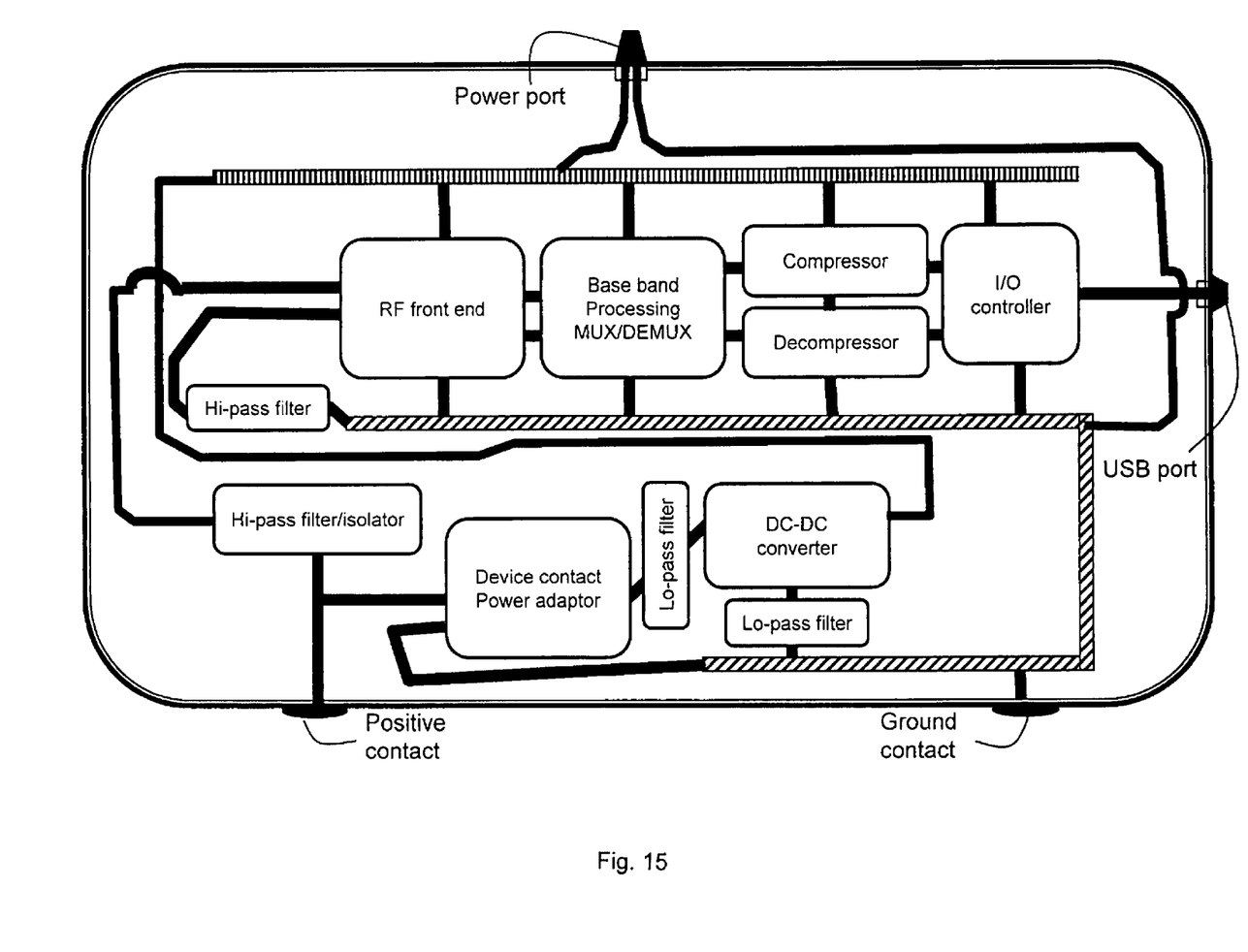
FIG. 15 illustrates another embodiment of the device adapter module which has an USB network interface.
Figure 16:
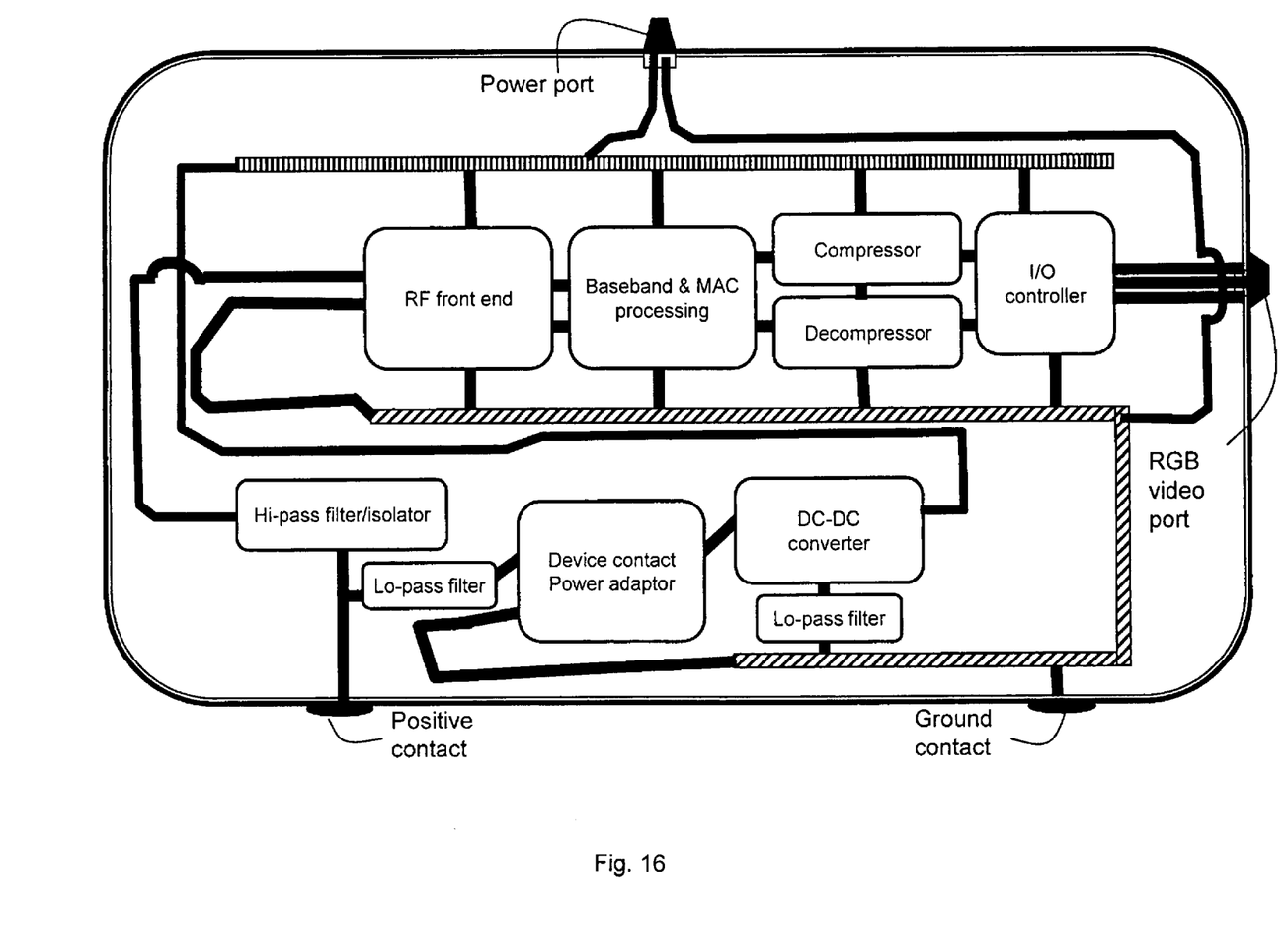
FIG. 16 illustrates yet another embodiment of the device adapter module which has an analog RGB video interface.

There is provided a system and method for data transfer over the same electrical routing network utilized by the mobile device to obtain electric power from an external power source. In one embodiment, the system includes a contact base connected to a power supply, and mobile device adapters. The contact base is a flat surface that comprises a segmented conductive area with conductive contact pads on the surface, and a plurality of base controller modules that detect the presence of compatible mobile devices placed on the contact surface and routes the electrical power through the contact points on the surface to the compatible mobile devices accordingly, after a handshake protocol. In one embodiment, the data communication portion of the system comprises a power line communication (PLC) bypass circuit and a repeater for PLC either within or adjunct to the power supply that powers the contact base. It further comprises, on the mobile device side, a PLC adapter which converts the analog waveform the mobile device receives through its electrical contacts into digital data and vice versa. The analog PLC signals propagate over the contact base through its positive voltage rail and the ground rail, and then through the PLC bypass in the power supply to the power line infrastructure in a home or office building. Over power line, the PLC signals communicate with a PLC bridge module which is either directly connected to the Internet or to the local area network (LAN). The return PLC signals travel along the same pathway in reverse. Optionally, the power supply also includes a PLC repeater which comprises a bi-directional amplifier to amplify PLC signals traveling in both directions.

What is claimed is:

1. A system comprising:
a substantially flat top surface having a plurality of electrical conductive contact points, the contact points configured to form an electrical contact with conducting contacts of a secondary device placed on the surface, wherein the conducting contacts of the secondary device form electrical contact with at least two distinct contact blocks of the surface, electrical current flowing between the surface and the at least one secondary device, the electrical contact configured to transfer power and data;
a switched mode power supply configured to provide power to the contact points;
a power line communication bypass circuit configured to send and receive data signals over an existing power line infrastructure, the data signals bypassing the power supply, and the power line communication bypass circuit configured to filter out high frequency switching noise from the switched mode power supply;
a bi-directional radio frequency repeater circuit configured to filter and amplify the data signals, the bi-directional radio frequency repeater circuit including one or more RF switches and an RF power detection circuit configured to control the one or more RF switches;
wherein the RF power detection circuit monitors the power level of the amplified data signals until the amplified data signal reaches a preset power level; and
wherein the power line communication bypass circuit uses a 1:1 ratio high frequency transformer and a parallel RC circuit to filter out lower frequency components.

2. The system of claim 1, wherein the electrical current includes at least one of DC electric current and DC electric current with a superimposed AC current.

3. The system as claimed in claim 1, wherein the secondary device comprises at least one device adapter module including function blocks configured to process said AC current.

4. The system as claimed in claim 3, wherein said function blocks comprise a radio frequency front end, a baseband processing unit, and a medium access controller.

5. The system as claimed in claim 4, wherein said function blocks include radio frequency filters to reduce noise from interfering with the processing of said AC current.

6. The system as claimed in claim 5, wherein said medium access controller uses carrier sense multiple access with collision avoidance (CSMA/CA) protocol.

7. The system as claimed in claim 4, wherein said function blocks process said AC current using a power line communications protocol of HomePlug.

8. The system as claimed in claim 3, wherein the secondary device additionally comprises a data compressor and a data decompressor.

9. The system of claim 8 wherein the device adapter module comprises the data compressor and the data decompressor.

10. The system of claim 1, wherein the electrical conductive contact points are segmented into a plurality of mutually isolated blocks to be controlled by electrical switches, with said isolated blocks connected to at least two said electrical switches which are connected to distinct said conductors.

11. The system as claimed in claim 10, wherein said conductors are configured to conduct AC current in a radio frequency range of at least 3 kilohertz.

12. The system as claimed in claim 10, wherein said power supply is configured to support coupling of said AC current between an input and an output of the power supply.

13. The system as claimed in claim 12, wherein said power supply includes the power line communication bypass circuit.

14. The system as claimed in claim 12, wherein said power supply includes the bi-directional radio frequency repeater circuit, the bi-directional radio frequency repeater circuit configured to amplify said AC current traveling between the input and output of said power supply.

15. The system as claimed in claim 10, wherein one or more of said conductors is a coplanar waveguide (CPW).

16. The system as claimed in claim 1, further comprising a plurality of controller modules configured to detect the presence of mobile devices placed on the surface and to route power through the contact to the compatible mobile devices, after a handshake protocol.

17. A method comprising:
transferring power and data between a substantially flat top surface having a plurality of electrical conductive contact points and conducting contacts of a secondary device placed on the surface, wherein the conducting contacts of the secondary device form electrical contact with at least two distinct contact blocks of the surface, electrical current flowing between the surface and the at least one secondary device;
providing, via a switched mode power supply, power to the contact points;
transmitting data signals via a power line communication bypass circuit configured to send and receive data signals over an existing power line infrastructure, the data signals bypassing the power supply, and the power line communication bypass circuit configured to filter out high frequency switching noise from the switched mode power supply configured to filter out high frequency switching noise from the switched mode power supply;
filtering and amplifying the data signals via a bi-directional radio frequency repeater circuit including one or more RF switches and an RF power detection circuit configured to control the one or more RF switches;
wherein the RF power detection circuit monitors the power level of the amplified data signals until the amplified data signal reaches a preset power level; and
wherein the power line communication bypass circuit uses a 1:1 ratio high frequency transformer and a parallel RC circuit to filter out lower frequency components.

* * * * *